March 27, 1951 A. B. DESNOES 2,546,334
TELEPHONE SUBSTATION HAVING
HEARING AID FACILITIES
Filed Dec. 17, 1948
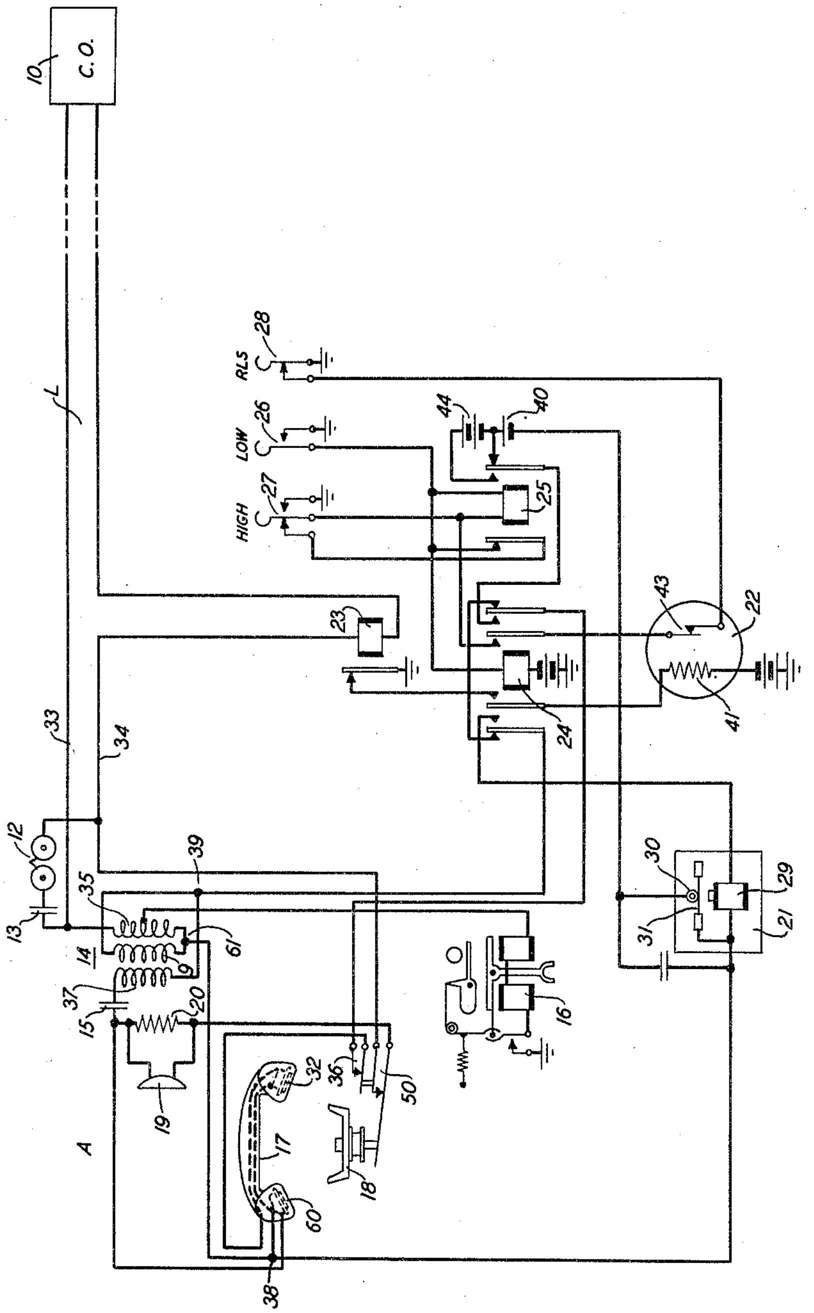
INVENTOR
A. B. DESNOES
BY
ATTORNEY Patented Mar. 27, 1951 2,546,334

UNITED STATES PATENT OFFICE 2,546,334

TELEPHONE SUBSTATION HAVING HEARING AID FACILITIES

Arnold Bonaventure Desnoes, Massapequa, N. Y., assignor to American Telephone and Telegraph Company, a corporation of New York Application December 17, 1948, Serial No. 65,837

3 Claims. (Cl. 179—81)

This invention relates to telephone systems and, more particularly, to facilities for regulating the level of speech signals at a telephone subscriber's station.

It is the object of this invention to provide improved communication facilities at unattended public telephone stations whereby patrons with impaired hearing are enabled to participate in telephone conversation with a minimum of effort.

This object is attained in accordance with a feature of the invention by the provision of means at the substation for amplifying speech signals to predetermined extents before translation by the receiver, or signal reproducing means at the station, and of manually-controlled means for including the amplifying means in the substation circuit and for adjusting its output at will.

In accordance with a particular feature of the invention the amplifying means, having been cut into service by a patron, may be manually cut out at any time during an established connection involving the station at which the amplifying facilities are located, and is automatically cut out at the termination of the established connection if not previously cut out manually.

An further feature of the invention resides in the use of timing means which introduces a delay interval between the termination of an established connection and the disabling, or cutting out, of the amplifying means.

These and other features of the invention will be readily understood from the following detailed description when read with reference to the accompanying drawing, the single figure of which illustrates diagrammatically the instrumentalities usually located at a telephone pay station and the supplementary instrumentalities by which the features of this invention are attained.

In the drawing the regular substation instrumentalities are shown terminating the line L at station A, the other end of the line being illustrated as terminating in the central office schematically indicated by the rectangle, or block 10. These instrumentalities include the ringer 12 and its associated condenser 13, a three-winding induction coil 14 and the associated condenser 15, a coin magnet or relay 16, a telephone instrument 17 comprising transmitter 60 and receiver 32, a telephone support 18 and the associated switch-hook contacts 36 and 50, and the usual gong transmitter 19 and its shunting resistance 20. It is believed unnecessary to describe in detail how these instrumentalities are interconnected or to set forth the functions performed thereby since they are well known in the art.

The supplemental equipment which is located at the substation A and by which the features of the invention are attained include an amplifier 21, a thermal relay 22, a supervisory relay 23, two control relays 24 and 25, a pair of batteries, or dry cells 40 and 44, and three manually operable, non-locking keys 26, 27 and 28. The amplifier 21 preferably is of the mechanical type and comprises a combined receiver 29 and microphone 30 of small size having a common diaphragm 31. This amplifier may be of the type disclosed in A. F. Bennett-R. E. Polk-W. L. Tuffnell Patent No. 2,242,284, granted May 20, 1941.

With keys 26, 27 and 28 in their normal, illustrated positions the substation equipment at station A is conditioned for normal speech reception, that is, when the instrument 17 is removed from its switch-hook, or cradle support 18 the incoming speech signals will be reproduced in the receiver element 32 at normal speech level. These signals traverse a path which may be traced from the line conductor 33, winding 35 of induction coil 14, common coil terminal 61, common instrument terminal 38, transmitter 60, gong transmitter 19 and shunting resistance 20, the transmitter switch-hook contacts 50 and back to line conductor 34. These signals appear across the terminals 39 and 61 which, terminate the winding 9, by induction as is well known in the art and characteristic of the well known anti-sidetone substation circuit. The receiver circuit may be traced from the coil terminal 39, to the outer left armature and back contact of relay 24, back contact and outer right armature of relay 24, receiver switch-hook contacts 36, receiver 32, to terminals 60 and 61. The winding 37 and condenser 15 comprise the usual balancing devices of the anti-sidetone circuit. The incoming speech signals are thus reproduced at normal speech level in the receiver 32.

Should the patron at station A require amplification of the incoming speech signals key 26 would be momentarily operated causing relay 24 to operate in an obvious circuit. With relay 24 operated, the receiver unit 29 of the amplifier 21 is connected across the induction coil terminals 61 and 39 by way of the outer left armature and front contact of relay 24, in place of the regular receiver 32 which is now connected in series with the transmitter element 30 of the amplifier 21 and the low voltage battery 40 by way of the left armature and back contact of relay 25, the front contact and outer right armature of relay 24 and switch-hook contacts 36.

Relay 24, at its inner left armature and front contact prepares an energizing circuit for the winding 41 of thermal relay 22, which circuit is, at this time, open at the back contact of relay 23, it being understood that relay 23 is operated from battery at the central office over the closed station loop just so long as the telephone 17 at station A is off its support 18. Thus, the speech signals incoming over line L are amplified by the amplifier 21 and reproduced in amplified form by the receiver 32.

It will be noted at this time that when relay 24 operated, it locked in a circuit which may be traced from grounded battery, winding of relay 24, back contact and left armature of relay 25, normal contacts of key 27, front contact and inner right armature of relay 24, normal contacts 43 of thermal relay 22, normal contacts of "release" key 28, to ground. Thus, relay 24 remains operated independently of key 26, which, being non-locking, restores as soon as the patron removes his or her hand therefrom.

Should the patron require further amplification of the speech signals, the key 27 would be momentarily operated, connecting the winding of relay 25 in series with the winding of relay 24 thereby permitting relay 25 to operate in series with the already operated relay 24 and to lock under control of the contacts 43 of thermal relay 22 and the normal contacts of key 28. The only change which results from the operation of relay 25 is the addition of the higher voltage battery 44 to battery 40 in circuit with transmitter 30 of the amplifier 21. Obviously, under this condition the incoming speech signals are reproduced in the receiver 32 at a higher level.

If, at any time during the connection the patron at station A desires to cut out, or disable, the amplifier 21 it is only necessary to momentarily actuate the "release" key 28. This operation opens the locking circuit for relay 24, or for relays 24 and 25 if both were operated, causing the restoration of the circuit to normal condition.

Should the patron at station A restore the telephone 17 to its support 18 at the termination of the connection without actuating "release" key 28 the amplifier 21 is automatically cut out in the following manner: When the telephone 17 is restored to its support 18 the station loop is opened in the well-known manner resulting in the release of relay 23. At its armature and back contact relay 23 completes an energizing circuit for the winding 41 of thermal relay 22 which includes the front contact and inner left armature of relay 24. After a predetermined interval of time the thermal relay 22 opens its contacts 43 thus opening the locking circuit for relay 24 (or relays 24 and 25). Relay 24 releases restoring the circuit to normal condition and, at its left armature, opens the circuit to winding 41 of thermal relay which relay then restores its contacts 43 to normal.

The introduction of a time interval between the restoration of the telephone to its support at station A and the disconnection of the amplifier is to prevent premature disconnection of the amplifier due to dialing (at dial stations) flashing, cord changing, etc.

The various elements of the supplemental equipment at the coin box station may be located in any convenient place, or places, it being understood, of course, that the keys 26, 27 and 28 will be positioned so as to be conveniently accessible to the patron and will be designated "Low," "High" and "Release" respectively.

While the invention is disclosed and described as applied to a coin box station, it is obviously applicable to stations of other types and also to dial equipped stations as well as the manual station illustrated.

What is claimed is:

1. In a telephone system, a line extending from a central office to a substation, a telephone set at said substation including a handset normally carried on a support, an amplifier at said substation, a switch operable manually while said handset is carried on the support to prepare said amplifier for connection to said line, contact means operated incident to the removal of said handset from the support for completing the connection of said amplifier to said line, and means for effecting the disconnection of said amplifier from said line while said switch is in its operated position comprising a relay included in said line circuit and an energizing circuit therefore including said contact means.

2. In a telephone system, a station, a central office, a line interconnecting said station and said central office, a telephone at said station, switchhook contacts controlled thereby, an amplifier at said station, a key at said station, a thermal relay at said station, switching means responsive to the actuation of said key and to the operation of said switchhook contacts incident to the removal of said telephone from its support at said station for connecting said amplifier to said line and for preparing an energizing circuit to said thermal relay, switching means included in said line circuit adapted to complete the energizing circuit to said thermal relay when said telephone is returned to its support at said station, and means controlled by said thermal relay for causing the disconnection of said amplifier from said line and the interruption of the energizing circuit thereto.

3. In a telephone system, a line, a station on said line, a central office connected to said station by way of said line, a telephone at said station, a support therefor, switchhook contacts operated to closed condition when said telephone is lifted from its support and to open condition when said telephone is on its support, an amplifier, a manually operated switch, switching means responsive to a single momentary operation of said manually operated switch only when said telephone is lifted from its support and said switchhook contacts are thus closed for connecting said amplifier to said line, a locking circuit for said switching means, a thermal relay having contacts normally rendering said locking circuit complete, and means controllable from either said station or said central office for causing the operation of said thermal relay and the consequent opening of said locking circuit whereby said switching means functions to disconnect said amplifier from said line.

ARNOLD BONAVENTURE DESNOES.

REFERENCES CITED

The following references are of record in the file of this patent:

UNITED STATES PATENTS

| Number | Name | Date |
|---|---|---|
| 2,319,754 | Spahn | May 18, 1943 |
| 2,320,726 | Herckman | June 1, 1943 |
| 2,337,900 | King | Dec. 28, 1943 |
| 2,361,880 | Shann | Oct. 31, 1944 |
| 2,381,986 | Shann | Aug. 14, 1945 |
| 2,385,265 | Foley | Sept. 18, 1945 |